United States Patent [19]

Rothbone et al.

[11] Patent Number: 4,786,167

[45] Date of Patent: Nov. 22, 1988

[54] OPTICAL NAVIGATION SYSTEM

[76] Inventors: Richard R. Rothbone, 1800 Whitney Ave., Hamden, Conn. 06517; Robert A. Valley, Jr., 511 George St., New Haven, Conn. 06511; Peter J. Kindlman, 126 Birch Rd., Guilford, Conn., 7; Robert A. Valley, Sr., 32 Meadow Wood Rd., Branford, Conn. 06405

[21] Appl. No.: 783,578

[22] Filed: Oct. 3, 1985

[51] Int. Cl.$^4$ .......................... G01B 11/26; G01B 3/00
[52] U.S. Cl. ................................. 356/141; 250/237 R; 356/1; 356/152
[58] Field of Search ............... 356/152, 1 H; 250/203, 250/237 R

[56] References Cited

U.S. PATENT DOCUMENTS

| | | |
|---|---|---|
| 3,951,550 | 4/1976 | Slick . |
| 4,112,294 | 9/1978 | Pressiat . |
| 4,225,781 | 9/1980 | Hammons ............................ 356/152 |
| 4,286,760 | 9/1981 | Coudere et al. . |
| 4,311,385 | 1/1982 | Keene ................................. 356/152 |
| 4,314,761 | 2/1982 | Renymond et al. ................ 356/152 |
| 4,328,545 | 5/1982 | Halsall et al. . |
| 4,475,814 | 10/1984 | Marche ............................... 356/152 |
| 4,664,518 | 5/1987 | Pfund ................................. 356/152 |

OTHER PUBLICATIONS

ITT, IC-Kit for Infrared Remote Control, Apr. 1979, Lawrence, MA.

Primary Examiner—Stephen C. Buczinski
Assistant Examiner—Linda J. Wallace
Attorney, Agent, or Firm—Keith M. Baxter

[57] ABSTRACT

A navigation device for wheeled vehicles using an optical locating system to determine the vehicle's position with respect to a set of coded, and therefore separately identifiable, fixed beacons. This optically obtained navigational information is used in conjunction with information from revolution counters on the vehicle's wheels to permit operation when one or no beacons are visible, and to refine the accuracy of the position determination as derived from the optical system alone.

7 Claims, 2 Drawing Sheets

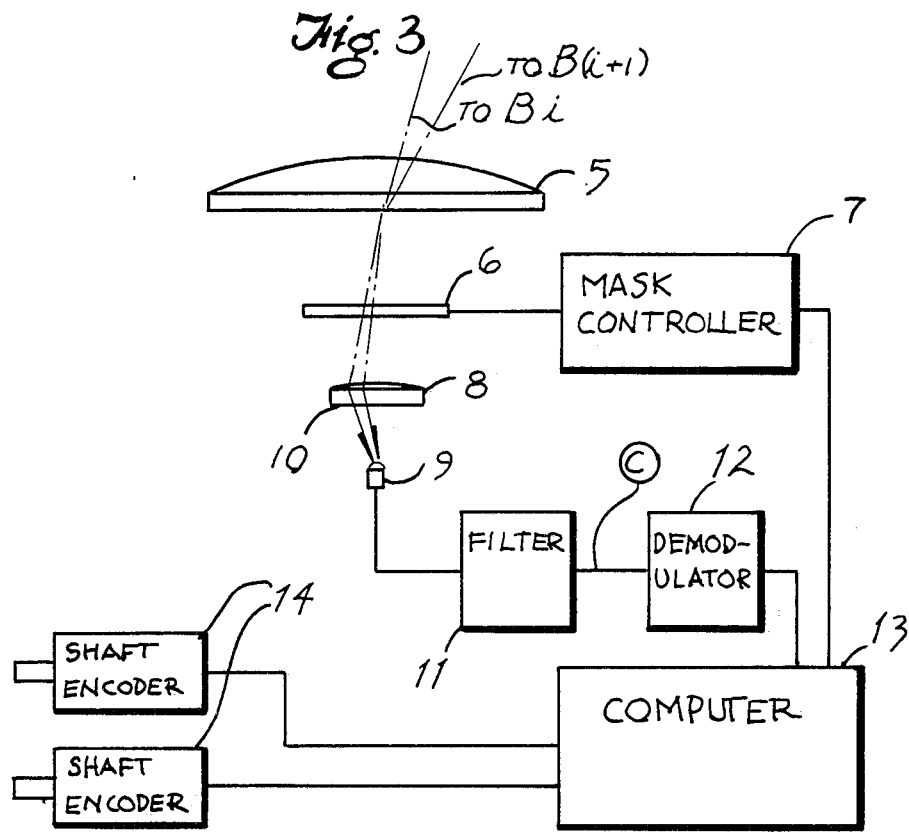
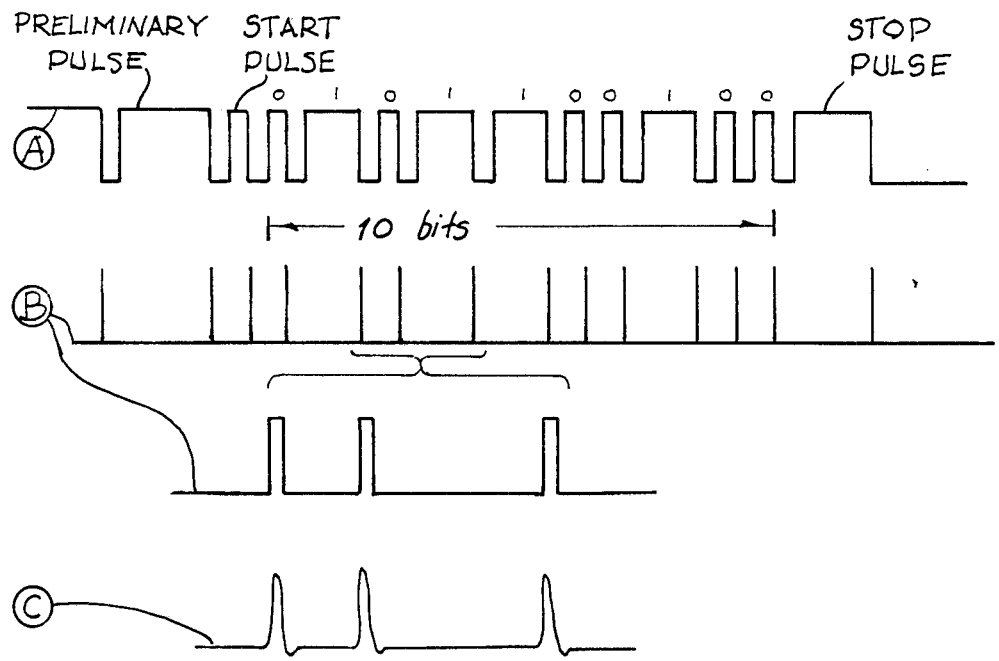

OPTICAL NAVIGATION SYSTEM

FIELD OF THE INVENTION

This invention relates generally to optoelectric devices for determining the angular position of remote light sources, and, in particular to a device that can differentiate between, and determine the position of, a plurality of fixed light sources.

This invention finds application as an element of a navigation system for remotely guided wheeled vehicles, where the tracking of two or more external beacons may provide triangulation of the vehicle's position, or the tracking of a single beacon may be used, in conjunction with position information received from a secondary navigational system, to determine or corroborate the vehicle's position.

BACKGROUND OF THE INVENTION

Several systems for determining the angular location of a single external light source are disclosed in prior patents. A system using a plurality of detectors positioned behind an adjustable mask is disclosed in Reymond et al., U.S. Pat. No. 4,314,761 issued Feb. 9, 1982. The system so disclosed however, is unable to distinguish between multiple sources. Although it is used in conjunction with a number of external sources, such sources are illuminated one at a time and to be distinguished, the sequential illumination of these sources must be precisely phased with the detecting circuitry. Because of its inability to identify multiple simultaneous beacons, this system, when confronted with multiple sources, will register spurious position information or 'ghosts', the total number of registered images being equal to the square of the number of sources in the field of view.

U.S. Pat. No. 4,112,294, Pressiat, et. al., discloses a similar system comprising a four quadrant mask and a single detector. Again, as is clear from the disclosure, such a system is unable to distinguish between multiple sources. When confronted with resolvable multiple sources, this latter system will ignore one. Which source is ignored, in general, will be unpredictable.

SUMMARY OF THE INVENTION

The ability to track and identify, simultaneously, at least two light sources, is central to any sophisticated optical navigational system. Such a system, as a rule, requires three bearings to known references (with the vector of gravity frequently being one of those bearings) in order to uniquely locate itself in space with respect to those given references. It is the object of the present invention to provide a means for distinguishing and locating the angular position of an arbitrary number of separate light sources and thereby provide sufficient navigational information to uniquely locate an object in space. It is a further object of this invention to provide a means for identifying such navigational beacons whereby the illumination of the beacons need not be synchronized with each other or the identifying device. Yet a further object of this invention is to use the bearing of as few as one reference beacon to confirm the position determination from a second, independent navigational means of lesser accuracy.

The invention herein described is composed of one or more external, illuminated beacons and a primary and secondary navigational unit attached to a vehicle. In accordance with the invention, the light signal from the beacons is modulated and a unique pattern of modulation assigned to each beacon. A lens system on the primary navigational unit, focuses the light from these beacons upon a planar photodetecting means, such means being capable of identifying the particular coordinates of its surface upon which the light signals are focussed. The photodetector and its associated circuitry provide a demodulated beacon signal and the coordinates of the focussed beacon signal to an ancillary computing device. The computing device, by identifying a beacons's modulation pattern and matching that to the detection coordinates of its signal, deduces an angular position for that beacon. Thus, in turn, the angular position of each visible beacon is determined.

When two or more beacons are visible, the position of the vehicle can be determined from their vertical and horizontal angular positions alone. When only one beacon is visible at a time, but it may be viewed from different locations, or different beacons are visible at different locations, the relative angular positions of these beacons may be recorded by the computing device. The computing device can then combine this information with additional information from a second navigational system which gives the location of the beacon sightings relative to one another. Such a second navigational system can determine relative position by measuring the rotation of the vehicle's wheels.

DESCRIPTION OF THE DRAWINGS

FIG. 3 is a block diagram illustrating the preferred embodiment of the primary and secondary navigational units.

FIG. 4 is a timing diagram for explaining the waveforms associated with the beacons and the primary navigational unit.

DETAILED DESCRIPTION OF THE PREFERRED EMBODIMENT

Figure 1:
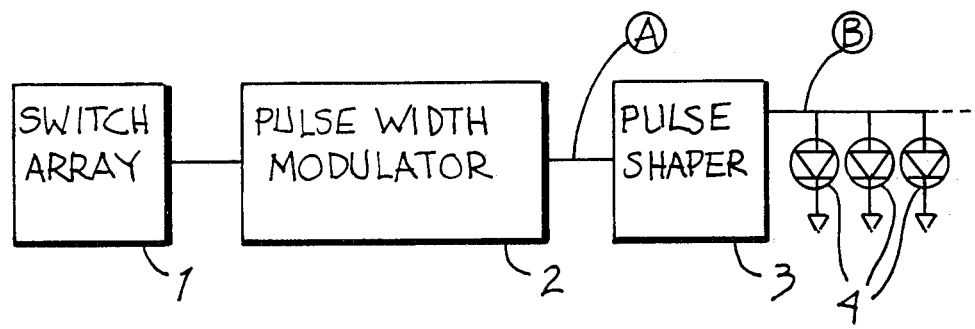
FIG. 1 is a block diagram illustrating the preferred embodiment of a typical beacon.

FIG. 1 shows a block diagram of a beacon composed according to the preferred embodiment of this invention with relevant waveforms shown in FIG. 4. A set of switches (1) programs a pulse width modulation circuit (2) to produce a 10-bit modulated pulse stream, (A). Each of the 10 bits may be individually set, allowing up to 1024 different patterns of modulation. Suitable pulse width modulation circuits are well known in the art and are commercially available in the form of a single integrated circuit. An example is the ITT SAA 1250, which is described in ITT publication 6251-152-1E, entitled: *IC-Kit for Infrared Remote Control* (April 1979).

The pulse stream frequencies for different beacons are adjusted to be of slightly different frequencies to prevent interference through the continued masking of one beacon by another.

The pulse stream from the modulation circuitry is processed by a pulse shaping circuit (3) into narrow (about 5 microsecond), high current pulses (1-2 amperes), which drive one or more infrared (880 nanometer) light emitting diodes (4).

The infrared range is chosen to match the peak sensitivities of many solid state detectors as well as the peak efficiency of many solid state lamps. In addition the infrared range minimizes interference from other manmade light sources which are typically of shorter wavelength and avoids the visual distraction inherent in a light source that is visible to eye.

Figure 2:
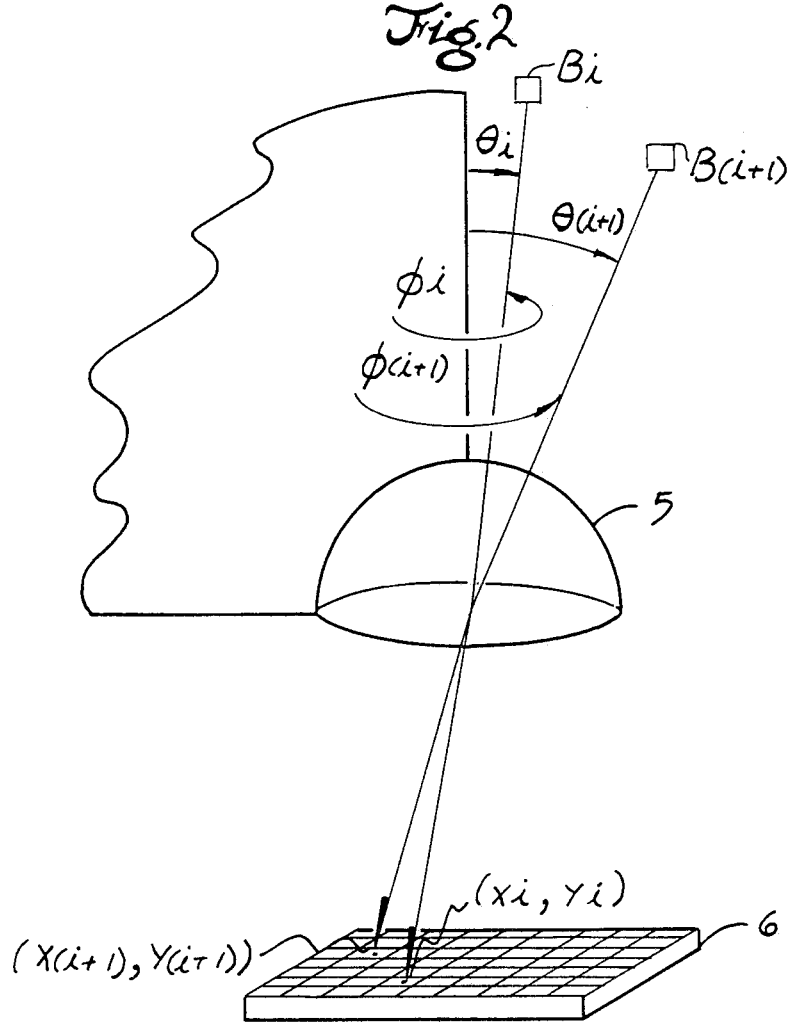
FIG. 2 is a simplified perspective view a portion of the navigational unit comprising the optical path from a beacon to the multielement mask.

The light from the several beacons is collected by a wide angle lens system (5) mounted on the primary navigational unit as depicted in FIGS. 2 and 3. The lens system serves to transform the angular position of the beacon (see FIG. 2) as expressed by ($\phi i$, $\phi i$) to a planar coordinate along mask (6) as expressed by ($x_i$, $y_i$). The formula for this transformation is empirically derived and is a function of the precise lens shape and the orientation of the mask and may be represented by the general transformation $x_i = f_1(\phi i, \phi i)$ and $y_i = f_2(\phi i, \phi i)$.

The mask (6) is a rectangular array of 1024 (32×32) liquid crystal elements. A liquid crystal array is chosen because of its low cost, yet it should be clear to one skilled in the art, that other compositions of electrically controllable masks, such as those composed of PLZT ceramic, would also be suitable in this application.

The elements of the mask are controlled by means of an associated electronic driving circuit (7) whereby a single element may be made transparent while all others are held opaque. In this manner, the entire field of the lens may be 'scanned' one element at a time so as to detect and locate the light from any beacon at any angle within the field of view of the lens system.

Light, so transmitted is collected by a second lens system (8) which serves to focus this light on the photodetector (9). The light path contains a gel type filter (10) to remove light outside the infrared range and thereby improve sensitivity.

The photodetector signal is amplified and filtered with a bandpass filter (11) appropriate to the spectral characteristics of the received pulse stream so as to supress background light fluctuations as well as high frequency shot noise from the detector. The resulting pulses are shown in FIG. 4, waveform (C). A threshold detector and demodulator circuit (12) recover the binary information contained in the pulse stream and send a serial binary data word to the ancillary computing device (13). Such decoding circuits are known in the art, a commercially available example being the ITT SAA 1251, the companion integrated circuit to the SAA 1250 modulator referred to above.

The combination of the mask and the single photodiode is the preferred implementation for the planar photodetecting device, however it should be clear to one skilled in the art that other such devices such as a photodetector array or a charge coupled device (CCD) array might be substituted in this function.

An auxiliary computation unit (13) is connected to both the processed photodetector signal and the mask controller circuitry whereby it may scan the mask and correlate the received photodetector signal with a set of stored templates of the modulation patterns for every beacon. By exploiting the functional relationship between mask position ($x_i$, $y_i$) and angular location ($\phi i$, $\phi i$) the angular location of each beacon within the field of view may be computed.

A secondary navigational unit is driven by two non-steerable, separated wheels on the same vehicle on which the primary navigational unit resides. Adjacent to each of these wheels is an auxiliary sense wheel with an attached rotary encoder (14) which produce a fixed number of pulses for each rotation of the wheel. The rotation of these sense wheels therefore provides a direct indication of the movement of the vehicle. The pulses are fed to an ancillary computational unit which counts the pulses and thereby determines the distance traveled by each wheel. Through this means and through knowing the placement and spacing of the wheels on the cart, the relative position of the vehicle, with respect to its last determined position, may be determined.

When two or more beacons are visible, this relative position may be ignored and the vehicle's location determined instead through triangulation. When only a single beacon is visible, the bearing of the beacon is used in conjunction with the relative position derived from the secondary navigational unit to determine or refine the vehicle's position. When no beacons are visible, the secondary navigational unit is relied upon exclusively.

While there has been shown and described what is at present considered to be the preferred embodiment of the present invention, modifications thereto will readily occur to those skilled in the art. It is not desired, therefore, that the invention be limited to the specific arrangement shown and described, but it is intended to cover all such modifications, alterations and changes falling within the true spirit and scope of the invention as defined in the appended claims.

What is claimed is:

1. A first navigational system for identifying and determining the angular location of a plurality of light radiating beacons comprising:
    (a) a number of non-polarized light radiating beacon means; a light from said beacon being modulated according to a set of predetermined, identifiable patterns
    (b) a planar multizoned photodetecting device capable of detecting the light from said beacons and its modulation, and distinguishing at which zones the light from said beacons is detected,
    (c) an optical means for focusing the light from the beacons on the photodetecting device throughout the angular displacement of the beacons with respect to the photodetecting device,
    (d) a first ancillary computing means connected to the planar photodetecting device for identifying the particular beacons through their pattern of modulation, and determining the absolute position in space of the photodetecting device or the beacons through the process of triangulation through the determination of two or more beacons' angular position by relating the presence or absence of a beacon signal to a given zone of the photodetecting device.

2. The device as defined in claim 1 wherein the planar multizoned photodetecting device is composed of:
    (a) a multielement mask means comprised of greater than four elements each of which may be made individually or jointly transparent, each element comprising a zone,
    (b) an optical means for focussing the light from said beacon transmitted by the mask onto a single photosensitive element
    (c) a first circuitry means for selectively controlling which elements of the mask are rendered transparent.

3. The device as defined in claim 2 comprising additionally:
    (a) a secondary navigation system
    (b) a second ancillary computing means for determining position, or refining a position determination, by comparing the line of position as determined from a single beacon bearing, computed by the first ancillary computing means, with the relative change in position, as provided by the secondary navigational system, since any previous determination of a beacon bearing.

4. The device as defined in claim 1 comprising additionally:
   (a) a secondary navigation system
   (b) a second ancillary computing means for determining position, or refining a position determination, by comparing the line of position as determined from a single beacon bearing, computed by the first ancillary computing means, with the relative change in position, as provided by the secondary navigational system, since any previous determination of a beacon bearing.

5. The device as defined in claim 4 wherein the planar multizoned photodetecting device is composed of:
   (a) a multielement mask means comprised of greater than four elements each of which may be made individually or jointly transparent, each element comprising a zone,
   (b) an optical means for focussing the light from said beacon transmitted by the mask on a single photosensitive element
   (c) a first circuitry means for selectively controlling which elements of the mask are rendered transparent.

6. A first navigational system for identifying and determining the angular location of a plurality of light radiating beacons comprising:
   (a) a number of light radiating beacon means; a light from said beacon means being modulated according to a set of predetermined, identifiable patterns
   (b) a multielement mask means comprised of greater than four elements each of which may be made individually or jointly transparent, each element comprising a zone,
   (c) an optical means for focusing the light from the beacons transmitted by the mask onto a single photosensitive element
   (d) a first circuitry means for selectively controlling which elements of the mask are rendered transparent,
   (e) an optical means for focusing the light from the beacons on the multielement mask throughout the angular displacement of the beacons with respect to the multielement mask
   (f) a first ancillary computing means connected to the planar photodetecting device for identifying the particular beacons through their pattern of modulation, and determining the beacons' angular position with respect to the multielement mask by relating the presence or absence of a beacon signal to a given zone of the multielement mask.

7. The device as defined in claim 6 comprising additionally:
   (a) a secondary navigation system
   (b) a second ancillary computing means for determining position, or refining a position determination, by comparing the line of position as determined from a single beacon bearing, computed by the first ancillary computing means, with the relative change in position, as provided by the secondary navigational system, since any previous determination of a beacon bearing.

* * * * *